United States Patent
O'Reilly et al.

(10) Patent No.: US 10,884,646 B2
(45) Date of Patent: Jan. 5, 2021

(54) DATA MANAGEMENT SYSTEM FOR STORAGE TIERS

(71) Applicant: International Business Machines Corporation, Armonk, NY (US)

(72) Inventors: Gavin C. O'Reilly, Kilcoole (IE); Susheel Gooly, Tampines (SG); Clea A. Zolotow, Key West, FL (US); Tedrick N. Northway, High Springs, FL (US); Derek Lacey, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/182,084

(22) Filed: Nov. 6, 2018

(65) Prior Publication Data
US 2020/0142625 A1    May 7, 2020

(51) Int. Cl.
*G06F 12/00* (2006.01)
*G06F 3/06* (2006.01)
*G06F 16/13* (2019.01)
*G06F 16/11* (2019.01)
*G06F 16/185* (2019.01)

(52) U.S. Cl.
CPC .......... *G06F 3/0647* (2013.01); *G06F 3/0604* (2013.01); *G06F 3/0643* (2013.01); *G06F 3/0659* (2013.01); *G06F 3/0685* (2013.01); *G06F 16/122* (2019.01); *G06F 16/13* (2019.01); *G06F 16/185* (2019.01)

(58) Field of Classification Search
CPC . H04L 67/1097; H04L 1/0041; H04L 1/0042; G05B 19/4183; G06N 7/005; G06F 3/0647; G06F 16/122; G06F 16/13; G06F 16/185; G06F 3/0604; G06F 3/0643; G06F 3/0659; G06F 3/0685
See application file for complete search history.

(56) References Cited

U.S. PATENT DOCUMENTS 6,769,022 B1    7/2004    DeKoning et al.
7,103,731 B2    9/2006    Gibble et al.
(Continued)

OTHER PUBLICATIONS

Chen et al., ""Holistic Information Management Solutions,"" IBM Research Division, San Jose, California, RJ10351 (A0507-014), Jul. 12, 2005, 12 pages. https://pdfs.semanticscholar.org/f982/c09e29653ec50d60c0a5c6a4833f8d2882f4.pdf.
(Continued)

*Primary Examiner* — Mano Padmanabhan
*Assistant Examiner* — Mohammad S Hasan
(74) *Attorney, Agent, or Firm* — Yee & Associates, P.C.

(57) ABSTRACT

A method, apparatus, system, and computer program product for managing a storage system. Data associated with a set of tags is identified by a computer system using a policy, wherein the policy defines the set of tags for a set of types of data used in a process performed in an organization using data in the storage system. A set of storage tiers for the data associated with the set of tags is determined by the computer system using the policy. The policy defines the set of storage tiers for the data associated with the set of tags when the data associated with the set of tags is used by the process. The data associated with the set of tags is moved by the computer system to the set of storage tiers as determined using the policy.

19 Claims, 7 Drawing Sheets

(56) References Cited

U.S. PATENT DOCUMENTS

| | | | |
|---|---|---|---|
| 7,752,437 | B1 | 7/2010 | Thakur et al. |
| 8,073,880 | B2 | 12/2011 | LaMonica |
| 8,918,586 | B1* | 12/2014 | Todd ................... G06F 16/13 |
| | | | 711/117 |
| 9,916,107 | B2 | 3/2018 | Bolik et al. |
| 9,965,381 | B1* | 5/2018 | Sahin .................. G06F 3/0605 |
| 10,095,425 | B1* | 10/2018 | Martin ................. G06F 3/0665 |
| 10,481,820 | B1* | 11/2019 | Dunbar ................ G06F 3/0647 |
| 10,671,309 | B1* | 6/2020 | Glynn .................. G06F 3/0647 |
| 2002/0194369 | A1 | 12/2002 | Rawlins et al. |
| 2003/0037187 | A1 | 2/2003 | Hinton et al. |
| 2004/0002039 | A1* | 1/2004 | Draper .................... G09B 7/04 |
| | | | 434/118 |
| 2008/0114792 | A1* | 5/2008 | LaMonica ............... G06F 16/21 |
| 2008/0270462 | A1* | 10/2008 | Thomsen ............. G06F 16/355 |
| 2011/0161327 | A1* | 6/2011 | Pawar .................. G06F 16/13 |
| | | | 707/741 |
| 2015/0294233 | A1* | 10/2015 | Aultman ................ G06N 20/00 |
| | | | 706/12 |
| 2016/0011816 | A1* | 1/2016 | Aizman ................ G06F 3/0604 |
| | | | 711/117 |
| 2018/0121133 | A1* | 5/2018 | Bakke ................... G06F 3/0608 |
| 2018/0357228 | A1* | 12/2018 | Chen .................... G06F 16/164 |
| 2019/0072968 | A1* | 3/2019 | Will, IV ............... B60W 40/02 |
| 2019/0123983 | A1* | 4/2019 | Rao .................... H04L 41/0893 |
| 2019/0174208 | A1* | 6/2019 | Speicher ................. H04Q 9/00 |
| 2019/0342384 | A1* | 11/2019 | Pradhan ............. H04L 41/046 |
| 2019/0356609 | A1* | 11/2019 | Grunwald ........... G06F 11/2097 |
| 2020/0250132 | A1* | 8/2020 | Ramsden ............. G06F 16/122 |

OTHER PUBLICATIONS

Lovelace et al., "IBM Enterprise Content Management and System Storage Solutions: Working Together," IBM Redbooks Publication SG24-7558, Sep. 2008, Copyright International Business Machines Corporation 2008, 244 pages. http://www.redbooks.ibm.com/abstracts/sg247558.html.

* cited by examiner

DATA MANAGEMENT SYSTEM FOR STORAGE TIERS

BACKGROUND

1. Field

The disclosure relates generally to an improved computer system and more specifically to method, apparatus, system, and computer program product for managing data in different storage tiers.

2. Description of the Related Art

Larger and larger amounts of data are being collected and stored by organizations. Data can be stored in a number of types of storage ways. For example, data can be stored using block storage, file storage, object storage, and other suitable types of storage architectures.

Storage systems currently can manage storage of data in different tiers based on usage or user requests. For example, policies can define rules for managing the storage of data. For example, files that are used more than a threshold level can be placed in file storage as opposed to a lower tier storage. As another example, history about usage by users or applications can be used to move files from binary large object storage to file storage. This type of data management can be referred to as usage prefetching of data. As another example, user may request the movement of data from object storage to file storage for quicker or easier access.

SUMMARY

According to one embodiment of the present invention, a method manages a storage system. Data associated with a set of tags is identified by a computer system using a policy, wherein the policy defines the set of tags for a set of types of data used in a process performed in an organization using data in the storage system. A set of storage tiers for the data associated with the set of tags is determined by the computer system using the policy. The policy defines the set of storage tiers for the data associated with the set of tags when the data associated with the set of tags is used by the process. The data associated with the set of tags is moved by the computer system to the set of storage tiers as determined using the policy.

According to another embodiment of the present invention, a data management system comprises a storage system storing data in a set of storage tiers in the storage system and a computer system. The computer system identifies data associated with a set of tags using a policy. The policy defines the set of tags for a set of types of data used in a process performed in an organization using data in the storage system. The computer system determines the set of storage tiers for the data associated with the set of tags using the policy. The policy defines the set of storage tiers for the data associated with the set of tags when the data associated with the set of tags is used by the process. The computer system moves the data associated with the set of tags to the set of storage tiers as determined using the policy.

According to yet another embodiment of the present invention, a computer program product for managing data in a storage system comprises a computer-readable-storage media, first program code, second program code, and third program code stored on the computer-readable storage media. The first program code is run to identify data associated with a set of tags using a policy. The policy defines the set of tags for a set of types of data used in a process performed in an organization using data in the storage system. The second program code is run to determine a set of storage tiers for the data associated with the set of tags using the policy, wherein the policy defines the set of storage tiers for the data associated with the set of tags when the data associated with the set of tags is used by the process. The third program code is run to move the data associated with the set of tags to the set of storage tiers as determined using the policy.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The illustrative embodiments recognize and take into account that currently moving data from a one type of storage to another type of storage is based on actual usage of the data or requests made by users. For example, the illustrative embodiments recognize and take into account that organizations perform different processes that may require data at different times of the process. The illustrative embodiments recognize and take into account that current storage systems are unable to manage the movement of data between different types of storages based on organizational processes.

The illustrative embodiments recognize and take into account that it would be desirable to have a method and apparatus that take into account at least some of the issues discussed above, as well as other possible issues. For example, it would be desirable to have a method and apparatus that overcome a technical problem with moving data into a desired storage tier based on a process performed in an organization. In the illustrative examples, the process is at least one of a task, operation, or step performed by the organization. This process can include business processes of the organization.

Thus, the illustrative embodiments provide a method, apparatus, system, and computer program product for managing the storage of data in a storage system that comprises multiple tiers of storage. In one illustrative example, a computer system identifies data associated with a set of tags using a policy, wherein the policy defines the set of tags defining a set of types of data used in a process performed in an organization using data in the storage system. The computer system determines a set of storage tiers for the data associated with the set of tags using the policy, wherein the policy defines a set of storage tiers for the data associated with the set of tags when the data associated with the set of tags is used by the process. The computer system moves the data associated with the set of tags to the set of set of storage tiers as determined using the policy.

Figure 1:
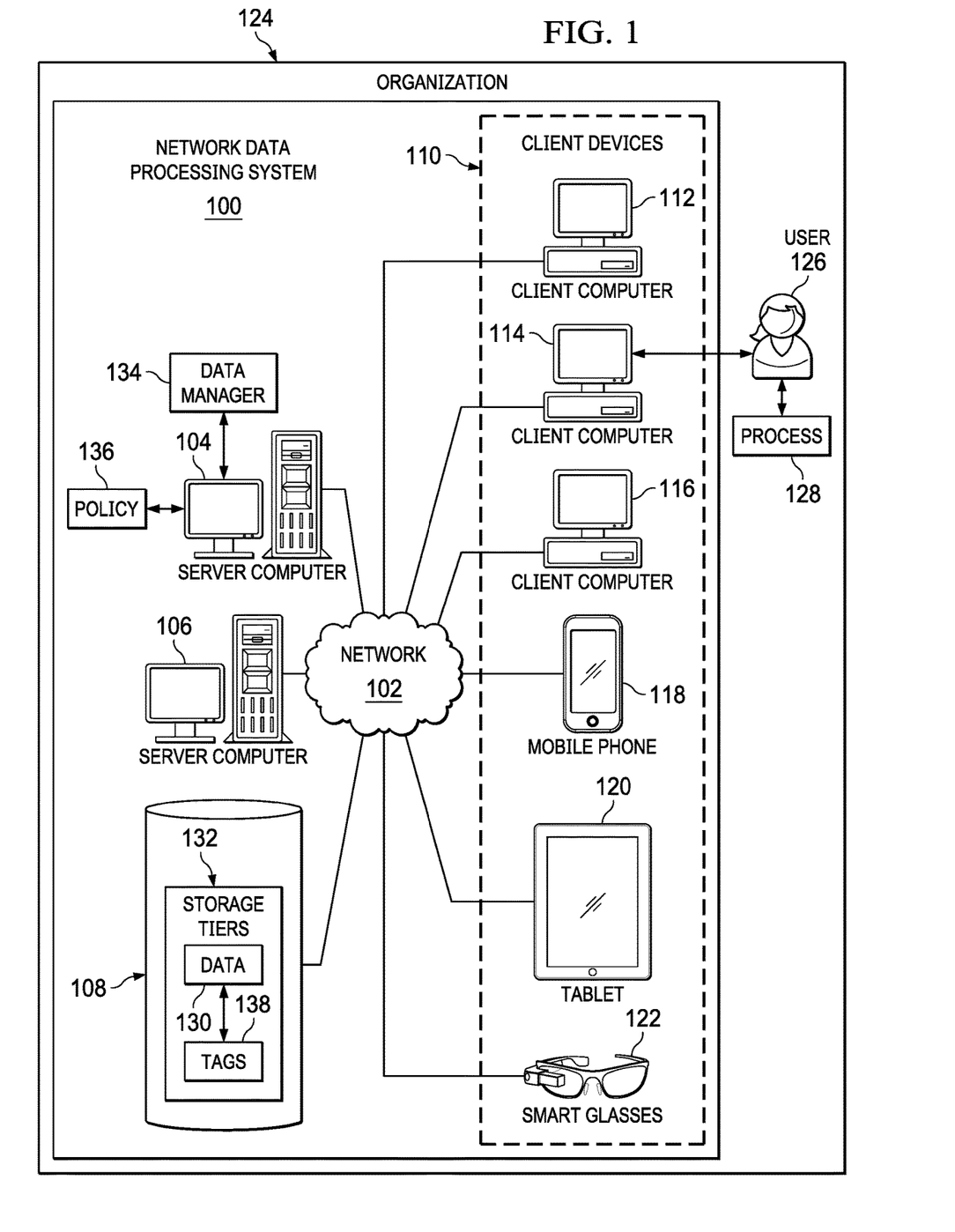
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage system 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage system 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, network data processing system 100 is part of the organization 124. Organization 124 can take a number of different forms. For example, organization 124 can be an accounting firm. As an accounting firm, organization 124 can perform processes using network data processing system 100. The processes can include, for example, at least one of payroll, accounting, tax preparation, audit, risk analysis, or other processes performed by organization 124.

As depicted, storage system 108 can be accessed by at least one of server computer 104, server computer 106, or client devices 110 in performing processes for organization 124. For example, user 126 can perform process 128 in organization 124 using client computer 114 in client devices 110. In performing this process, client computer 114 can access data 130 in storage tiers 132 within storage system 108. Storage tiers 132 includes different types of storage. Each storage tier in storage tiers 132 contains one or more storages that is different from the storages in another storage tier. For example, the different types of storage tiers can include at least one of a block storage, file storage, object storage, door storage, or other types of storage.

In this illustrative example, access to data needed by user 126 to perform process 128 can be more difficult if the needed data in data 130 is located in a type of storage that is more difficult to access. The difficulty access can be, for example, at least one of the speed at which data is accessed, the ability to locate the data, or other factors.

In this illustrative example, data manager 134 manages the storage of data in the different tiers in storage tiers 132 in storage system 108. Data manager can manage where data is stored in storage tiers 132 based on processes performed by organization 124. In this manner, the management of data takes into account processes performed by data as compared to current techniques that manage data based on usage or historical use for a particular software application.

In this illustrative example, data manager 134 uses policy 136 to manage data 130 stored in storage tiers 132 in storage system 108. As depicted, policy 136 is a set of rules and may include data used to apply the rules. Policy 136 is based on a set of processes performed by organization 124.

In this illustrative example, data manager 134 can move data 130 from one storage tiers to another the tier within storage tiers 132 based on process 128 performed by user 126. In this example, when process 128 is a tax preparation process, policy 136 can specify that tax preparation process occurs on a particular date or specify checking a scheduler or calendar to identify a date when the tax preparation process starts.

Policy 136 can also specify where the tax file should be located in storage tiers 132. In other words, policy 136 can identify the tier in storage tiers 132 in which the tax file should be located for the tax preparation process. Further, policy 136 can also specify when the tax files are needed with respect to the date the tax preparation process begins. For example, the tax files may be needed five hours, 36 hours, two days, or some other time prior to the start of the tax preparation process.

With policy 136, data manager 134 can analyze data 130 to identify tax files in data 130 and their locations in storage tiers 132. As depicted, at least some of data 130 is associated with tags 138. Data manager 134 can identify the location of the tax files using tags 138 that are associated with the tax files in storage tiers 132. Data management therefore can determine how much time is needed to process and move tax files from a current one storage tier to the desired storage in storage tiers 132. For example, if tax files are located in object storage and are to be placed in file storage base on policy 136, the prefetching or moving of tax files from the object storage file storage can be performed three days earlier to ensure that the tax files are ready when needed for the tax preparation process. Thus, data manager 134 can automatically move the tax files to the desired storage tier in storage tiers 132 such that the tax files are available when needed to perform the tax preparation process.

In the illustrative example, data manager 134 enables managing data 130 in storage tiers 132 such that the data is available in a desired storage tier based on when that data is to be used in process 128 for organization 124. In this manner, process 128 for organization 124 is aligned with the management of data 130 across different tiers in storage tiers 132.

Thus, data manager 134 and policy 136 can be used in process management of processes, such as process 128, for organization 124. In the illustrative example, data manager 134 can manage the movement of data 130 within storage tiers 132 in a manner that aids in the performance of process 128 in organization 124. For example, data 130 can be prefetched from one storage tier to another storage tier in storage tiers 132 such that data 130 is available for use in process 128 without process 128 having to wait for data 130 to be available.

The illustrative example in FIG. 1 is not meant to limit the manner in which other illustrative examples can be implemented. For example, process 128 is shown as being performed by user 126 in the form of a human user in the illustrative example. In other illustrative examples, user 126 can be another computing device or software component that performs process 128 without need for a human user.

Figure 2:
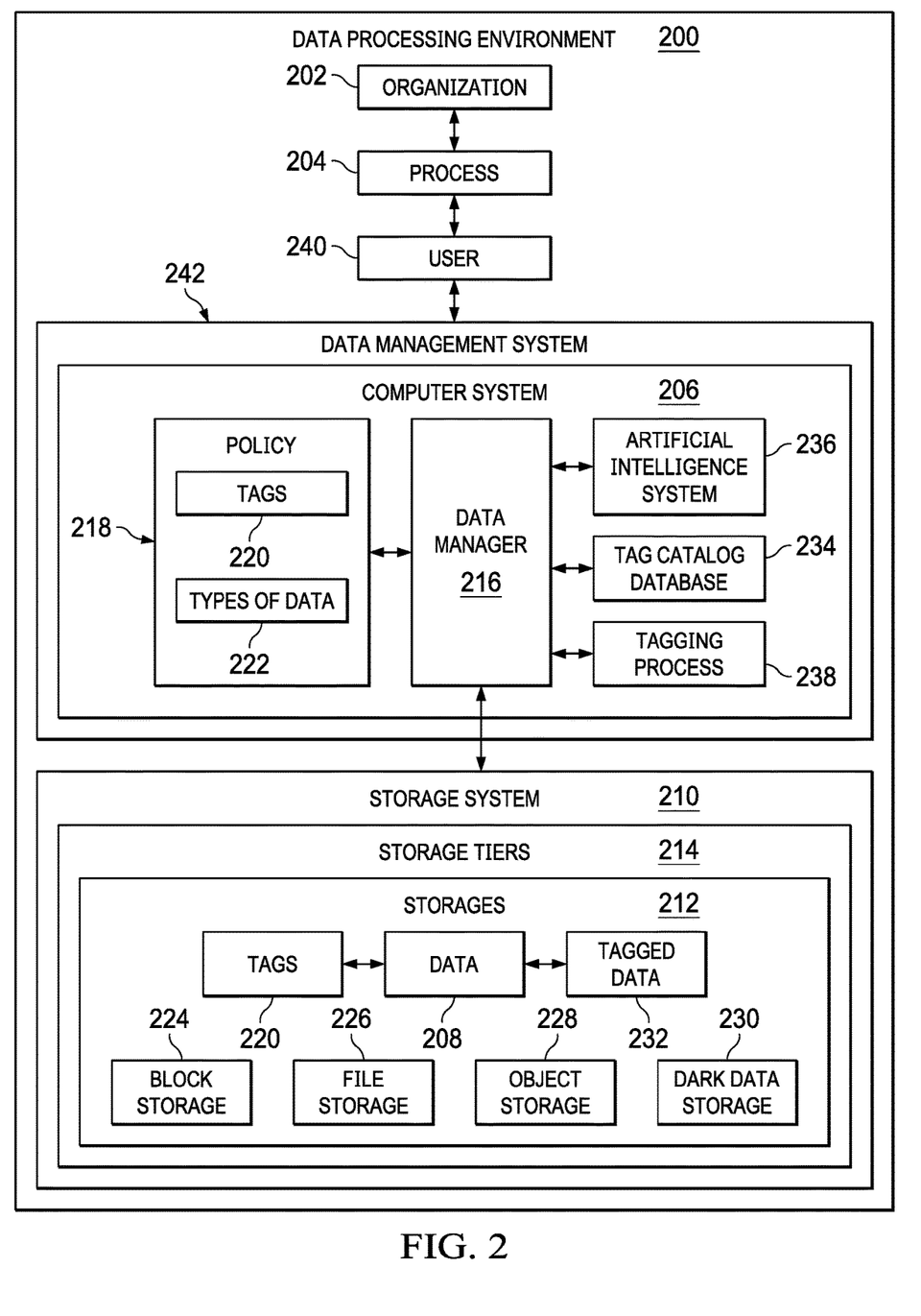
FIG. 2 is a block diagram of a data processing environment in accordance with an illustrative embodiment.

With reference now to FIG. 2, a block diagram of a data processing environment is depicted in accordance with an illustrative embodiment. In this illustrative example, data processing environment 200 includes components that can be implemented in hardware such as the hardware shown in network data processing system 100 in FIG. 1.

As depicted, organization 202 performs process 204. Organization 202 can be selected from a group comprising a company, a partnership, a charity, an educational group, a social group, a team, a city, a government agency, or some other suitable organization. Process 204 can include, for example, product design, budget planning, engineering design, simulation, inspection, payroll, accounting, tax preparation, risk analysis, or other processes performed by organization 202.

In this illustrative example, process 204 for organization 202 can be performed by computer system 206 using data 208. Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

Data 208 can take various forms. For example, data 208 can comprise at least one of a document, a spreadsheet, a PowerPoint presentation, a message, an image, weather data, rainfall data, temperature data, an audio file, a video, computer aided design (CAD) file, program code, sensor data, a configuration file, one other suitable types of data.

As depicted, data 208 is stored in storage system 210. In the illustrative example, storage system 210 is a physical hardware used to store data 208. Storage system 210 can be in a single location or distributed in multiple locations. For example, storage system 210 can be located in a building, or distributed among multiple locations within a city, state, country, or other type of geographic region. The hardware is distributed in different locations, the different locations can be in communication with each other using a communications media such as a network.

In this illustrative example, storage system 210 includes a set of storage tiers 214. Each storage tier has one or more storages 212 in which data 208 is stored. A storage in storages 212 is a least one of a physical or logical component that is used to store data 208. For example, a storage can be a file system, a volume, a memory, hard disk, solid state disk drive, or some other type of component used to store data.

In this example, storages 212 are arranged in storage tiers 214. Different tiers within the set of storage tiers 214 have different characteristics that are used in selecting a particular tier in the set of storage tiers 214 for use in storing data 208. For example, these factors include at least one latency, cost, ease of use, accessibility, searchability, or other factors. For example, the set of storage tiers 214 can include storages 212 such as block storage 224, file storage 226, object storage 228, and dark data storage 230.

In this illustrative example, the hierarchy of tiers in the set of storage tiers 214 is based on a performance characteristic such as speed of accessing data 208. In this example, block storage 224 is in the highest tier in the set of storage tiers 214. File storage 226 is in the tier below block storage 224. Object storage 228 is the tier below file storage 226. Dark data storage 230 is in the lowest tier in the set of storage tiers 214. Of course, other characteristics may be used organized the tiers. For example, at least one of storage cost, location, or other characteristics can be used in addition to or in place of performance to place the different types storage into the different tiers in storage tiers 214.

Block storage 224 stores data in volumes also referred to as blocks. Each block can be assigned an arbitrary identifier from which the block can be stored and retrieved. Metadata is not associated with the blocks. This type of storage is typically used in storage area network environments. Each block in act as an individual component with the block being controlled by server-based operating system. This type of blocks can be accessed through a protocol as Fiber Channel or Internet small computer system interface (ISCSI). Block storage often used within a local network and provides a desired level access for performance, transactional, and database oriented applications.

File storage 226 stores data in a hierarchical structure. For example, data can be saved in files and folders and presented to both the system storing and system retrieving the data in the same format. With file storage, files, directories, and subdirectories are present that use naming conventions that are based on characteristics such as extensions, categories, or applications. Metadata is associated with the files and includes, for example, creation date, creator, file type, most recent change, and last access. This type of storage works well with relatively small amounts of data. As the number of files increase, finding files through increased numbers of folders becomes increasingly more time-consuming and difficult. Further, file storage has higher latency than block storage but is more easily scalable than block storage.

Object storage 228 is a storage that manages data as objects. With data storage, each object includes the data, metadata, and a unique identifier. Object storage can be used to retain very large amounts of data. For example, object storage can be used to store photos, songs, messages, files in online collaboration services, or other types of data. The identifier can be stored in a model for data. Further, variable amounts of metadata can also be associated with objects. Thus, the object can be retrieved by using the metadata or the unique identifier for the object. This data can be stored in a local server, or any remote location. Binary large object (BLOB) storage is a type of object storage 228 and stores binary data a single entity. The data can include images, audio, multimedia data, binary executable code, or other types of data.

Dark data storage 230 stores dark data, which is unstructured data. Dark data can be data acquired through various network operations but not yet used in the operations of an organization. This type of data needs to be preprocessed. For example, data can be acquired at a rate that is greater than can be analyzed. The unanalyzed data is dark data. Data can also be collected but the organization can be unaware that the data is present. Dark data may include, for example, sensor data, converted data generated by analog to digital conversions, twitter conversations, or other types of data that may be collected but remained unanalyzed for various reasons.

In this illustrative example, data manager 216 in computer system 206 forms data management system 242 that operates to manage the storage of data 208 within storage tiers 214 of storage system 210. For example, data manager 216 manages where data 208 is stored in storages 212 in storage tiers 214 in storage system 210. Further, as needs for different portions of data 208 changes, data manager 216 can move the different portions of data 208 to different storages in different storage tiers in storage tiers 214.

This movement or migration of data 208 can be performed by data manager 216 using policy 218. In this example, policy 218 is a set of rules and can include data used to apply the rules. As depicted, policy 218 for data 208 is based on process 204 performed by organization 202. In this illustrative example, policy 218 defines a set of tags 220 for a set of types of data 222 used in process 204 performed in organization 202 using data 208 in storage system 210. As a result, data 208 associated with set of tags 220 can be moved within storage tiers 214 based on policy 218.

During the operation of the computer system 206, data manager 216 identifies data 208 associated with a set of tags 220 using policy 218 in which policy 218 defines the set of tags 220 for a set of types of data 222 used in process 204 performed in organization 202 using data 208 in storage system 210. In other words, data manager 216 finds data 208 that is used by process 204 and places data 208 in the appropriate set of storage tiers 214 for use to perform process 204.

Data manager 216 determines a set of storage tiers 214 for data 208 associated with the set of tags 220 using policy 218. In this illustrative example, policy 218 also defines a set of storage tiers 214 for data 208 associated with the set of tags 220 when data 208 associated with the set of tags 220 is used by process 204. In this manner, data manager 216 identifies which storage tiers in storage tiers 214 that data 208 identified for process 204 should be located. In moving data 208 within storage system 210, data 208 can be moved on a source file system to the set of storage tiers 214 in a target file system. In other illustrative examples, the movement of data 208 may be within the same file system depending on the particular implementation.

As depicted, data manager 216 moves data 208 associated with the set of tags 220 to the set of storage tiers 214 as determined using policy 218. In this manner, process 204 can access data 208 in an expected storage tier or expected storage tiers in storage tiers 214.

In these illustrative examples, data manager 216 can also process data 208 and associate tags 220 with data 208. For example, data manager 216 can associate the set of tags 220 with data 208 in set of storage tiers 214 in the storage system using policy 218 for process 204. In other words, policy 218 can define what types of data 222 in data 208 are used or needed by process 204. Further, policy 218 can define tags 220 that are used to identify types of data 222 for process 204.

In associating tags 220 with data 208, data manager 216 can search storage system 210 for data 208 having the set of types of data 222 used in process 204 using policy 218. Data manager 216 tags data 208 as having the set of types of data 222 for process 204 with the set of tags 220 using policy 218.

As depicted, data 208 associated with the set of tags 220 forms tagged data 232. Data manager 216 add entries for tagged data 232 in tagged catalog database 234. In this illustrative example, tagged catalog database 234 does not include the actual data. Instead, tagged catalog database 234 contains tags 220 and locations of where tagged data 232 can be found within storage system 210. This database is updated with new locations when data 208 is moved to different storage tiers in storage tiers 214.

As depicted, data manager 216 is in communication with artificial intelligence system 236. In this illustrative example, artificial intelligence system 236 can perform or aid in at least one of performing movement of data 208, tagging of data 208, updating or populating tagged catalog database 234, or other suitable operations.

Artificial intelligence system 236 is a system that has intelligent behavior and can be based on function of the human brain. An artificial intelligence system comprises at least one of an artificial neural network, cognitive system, a Bayesian network, fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system. A cognitive system is a computing system that mimics the function of a human brain. The cognitive system can be, for example, IBM Watson available from International Business Machines Corporation.

In performing tagging of data 208 using policy 218 to identify types of data 222 in data 208 used by process 204, data manager 216 creates tagging process 238 for associating the set of tags 220 with data 208 in the set of storage tiers 214 in storage system 210. In the illustrative example, tagging process 238 can access policy 218 for rules in policy 218 or rules in policy 218 can be implemented within tagging process 238.

Thus, process 204 in organization 202 can be performed using data 208 associated with tags 220 in the set of storage tiers 214. In this illustrative example, process 204 can be performed by user 240 interacting with computer system 206. As depicted, user 240 can be a human user or a process running on a computing device.

In the illustrative examples, data manager 216 in computer system 206 can be implemented in software, hardware, firmware or a combination thereof. When software is used, the operations performed by data manager 216 can be implemented in program code configured to run on hardware, such as a processor unit. When firmware is used, the operations performed by data manager 216 can be implemented in program code and data and stored in persistent memory to run on a processor unit. When hardware is employed, the hardware may include circuits that operate to perform the operations in data manager 216.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with managing the movement of data between different type of storages based on organizational processes. As a result, one or more technical solutions may provide a technical effect enabling the movement of data based on one or more processes performed in an organization. Further, one or more technical solutions are present that enable prefetching data across different storage tiers using tags for types of data used in a process such that the data is available when needed for performing the process in the organization.

Thus, one or more illustrative examples can be used to manage storage of data within a storage system in manner that aligns the location of the data within one or more storage tiers in the storage system to align the data to the manner in which the data is used by a process in an organization. For example, as data is received for storage, the data can be placed in an appropriate storage tier. As another example, existing data within the storage system can be moved between different storage tiers based on policy for one or more processes performed in an organization. For example, data that is not needed or used at the current time can be placed in a storage tier that is less expensive than another storage tier. As data is needed for performing the process, that data can be moved from a current storage tier to another storage tier based on policy defining what storage tier or storage tiers the data is to be located for performing the process. If the process has a particular start date, this movement of the data can include prefetching the data such that the data is present when the process is to be performed.

Computer system 206 can be configured to perform at least one of the steps, operations, or actions described in the different illustrative examples using software, hardware, firmware or a combination thereof. As a result, computer system 206 operates as a special purpose computer system in which data manager 216 in computer system 206 enables managing the movement of data 208 between different types of storages 212 based on organizational processes. In particular, data manager 216 transforms computer system 206 into a special purpose computer system as compared to currently available general computer systems that do not have data manager 216.

The illustration of data processing environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the depicted example illustrates performing process 204 in organization 202. One or more processes can be performed in organization 202 in addition to or in place of process 204. Additionally, artificial intelligence system 236 can be implemented as part of data manager 216 in some illustrative examples.

As another example, although for types of storages are shown as being in storage system 210. Fewer or more types of storages can be present in storage system 210. For example, storage system 210 can contain block storage 224, file storage 226, and dark data storage 230. In another illustrative example, another category storage can be present. For example, a virtual storage, a hybrid storage, or other type of storage schema can be used in addition to or in place of the storages illustrated in FIG. 2.

Figure 3:
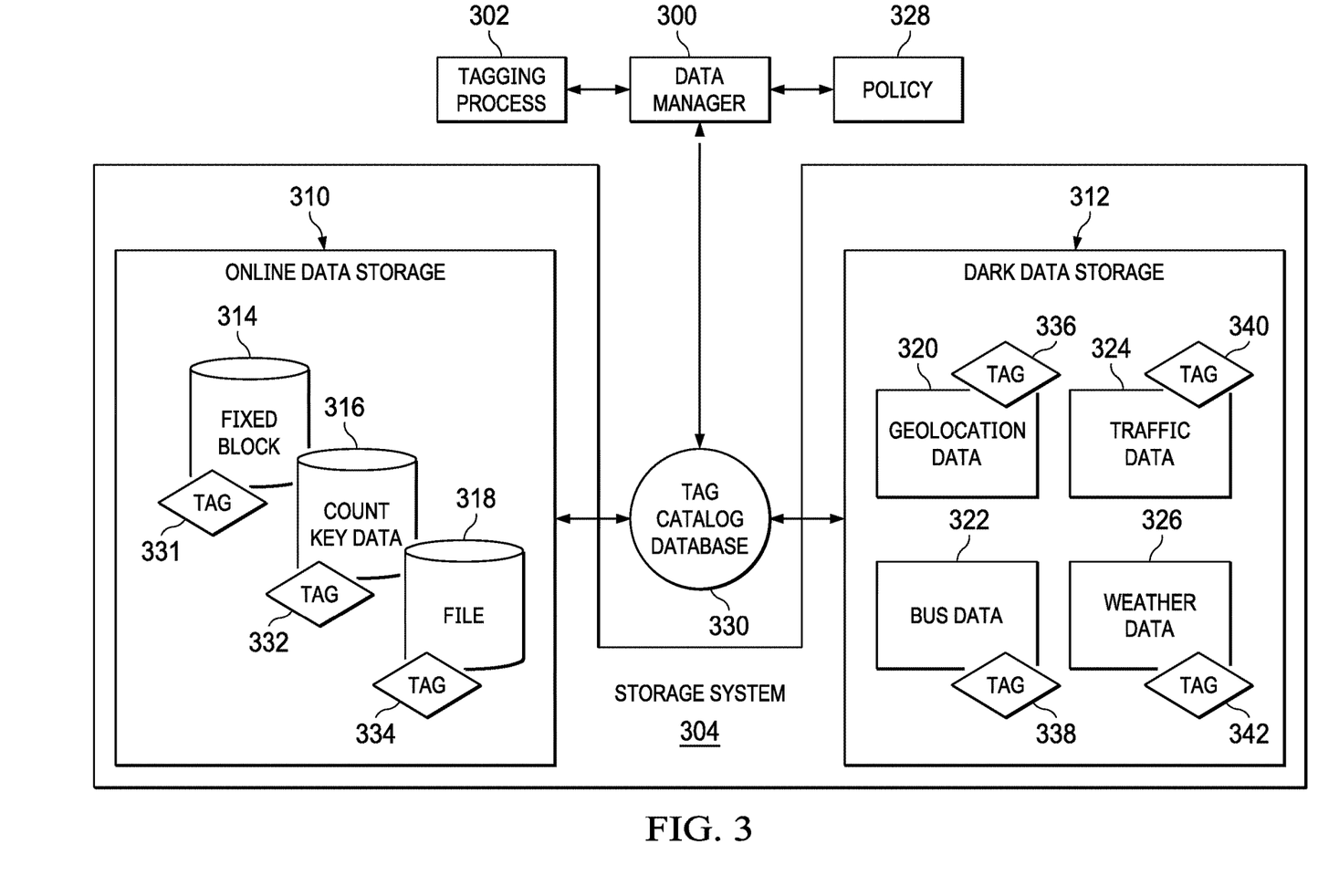
FIG. 3 is an illustration of tagging data for a tag catalog database in accordance with an illustrative embodiment.

Turning next to FIG. 3, an illustration of tagging data for a tag catalog database is depicted in accordance with an illustrative embodiment. In the illustrative examples, the same reference numeral may be used in more than one figure. This reuse of a reference numeral in different figures represents the same element in the different figures.

In this example, data manager 300 is an example of data manager 216 in FIG. 2. As depicted, data manager 300 includes tagging process 302 which is used to associate tags with data in storage system 304. Tagging process 302 is created to tag data for a process in an organization.

As depicted storage system, 304 includes online data storage 310 and dark data storage 312. Online data storage 310 stores fixed block 314, count key data 316, and file 318. In this depicted example, fixed block 314 is a type of block data stored in online data storage 310. Key count data 316 is direct access storage device (DASD) data. Fixed block 314 and key count data 316 can both be stored on a storage area network (SAN). File 318 is a file containing data stored in file storage in online data storage 310. Dark data storage 312 stores dark storage such as geolocation data 320, bus data 322, traffic data 324, and weather data 326. In this example, data in online data storage 310 can be accessed more easily and quickly as compared to data in dark data storage 312.

In one illustrative example, a use case can be an insurance company that wants to analyze accidents involving a particular class of vehicle, such as a bus. Input data could be the bus data 322 containing bus schedules; weather data 326, traffic data 324 about road conditions and other data related to traffic conditions streamed from sensors mounted on road vehicles, and geolocation data 320 about the locations of buses at different times.

A request can be made to obtain data for a process to analyze bus accidents. Tagging process 302 can be created to identify and tag for the bus claims for both legacy data in online data storage 310 and dark data in dark data storage 312.

As depicted, tagging process 302 operates to associate tags with data in storage system 304 based on policy 328. Tagging process 302 can use policy 328 or can implement rules in policy 328. In this example, tag 331 is associated with fixed block 314; tag 332 is associated with count key data 316, tag 334 is associated with file 318; tag 336 is associated geolocation data 320; tag 338 is associated with bus data 322, tag 340 is associated with traffic data 324; and tag 342 is associated with weather data 326.

In this illustrative example, data manager 300 populates tag catalog database 330 with entries based on tags associated with the data in online data storage 310 and dark data storage 312. Each of the entries includes a tag for a type of data and the location information for the type of data in storage system 304. The location information that identifies the location of the type of data can be identified, for example, a pointer, and Internet protocol address, or some other suitable type of addressing mechanism. In some illustrative examples, the data can be identified with a pointer. For example, a pointer can be used to point to a block, file, or object on a storage device or storage subsystem. In other illustrative examples, a mount or volume in which the data is located can be identified using a universal resource locator or an Internet protocol address. In other words, different levels of specificity can be used to point to the location of data in storage system 304.

Figure 4:
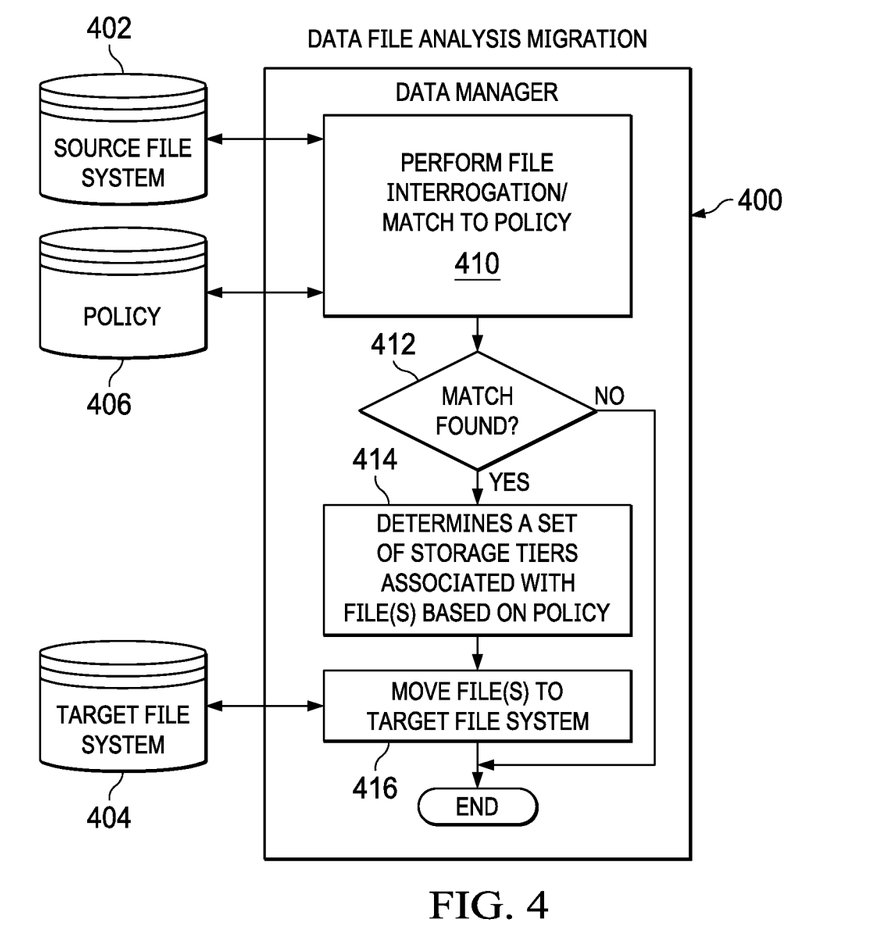
FIG. 4 is an illustration of data file analysis and migration in accordance with an illustrative embodiment.

With reference to FIG. 4, an illustration of data file analysis and migration is depicted in accordance with an illustrative embodiment. In this example, data manager 400, is an example of data manager 216 used to analyze and migrate data. In this illustrative example, data manager 400 can migrate data in files from source file system 402 to target file system 404 using policy 406.

As depicted, data manager 400 performs file interrogation and matching to policy 406 (step 410). In other words, data manager 400 examines files in source file system 402 and compares the files to policy 406. For example, data manager 400 can examine at least one of the meta data or the data itself to determine if any of the files have tags and if the tags match rules in policy 406.

Data manager 400 determines whether files match policy 406 (step 412). This interrogation matching can be performed by determining whether any of the files in target file system 404 have tags for types of data as defined in policy 406. If a match is not found, data manager 400 has completed analyzing the files in source file system 402. If a match is present, the process determines a set of storage tiers associated with the file or files based on policy 406 (step 414). In this example, the set storage tiers are located in target file system 404. The process then moves the file or files to the set of storage tiers in target file system 404 (step 416).

Figure 5:
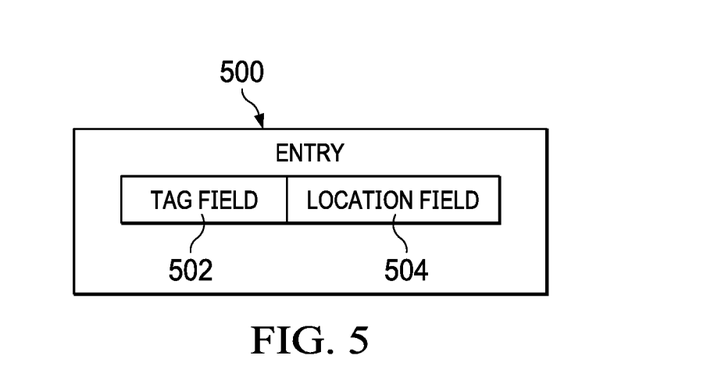
FIG. 5 is an entry in a tag catalog database in accordance with an illustrative embodiment.

Turning to FIG. 5, an entry in a tag catalog database is depicted in accordance with an illustrative embodiment. In this illustrative example, entry 500 is an example of an entry that can be used in a tag catalog database, such as tag catalog database 234 in FIG. 2 or tag catalog database 330 in FIG. 3.

As depicted, each piece of data can be identified with an entry such as entry 500. For example, an object, a block, a file, or some other form of data can have an entry in a tag catalog database.

In this illustrative example, entry 500 includes tag field 502 and location field 504. Tag field 502 includes one or more tags. Tags in tag field 502 can be used as index to identify entry 500 in a tag catalog database.

Location field 504 is the location of the piece of data. Location information in location field 504 can take a number of different forms. For example, location information in location field 504 include at least one of a reference, a pointer, a universal resource locator, an Internet protocol address, or some other suitable type of locating information that can be used to locate the piece of data. In some cases, location field 504 can be specific to a particular volume, folder, and file name. In other illustrative examples, location field 504 can point to a server, volume, mount, or some other physical or logical system in which the data can be found.

Figure 6:
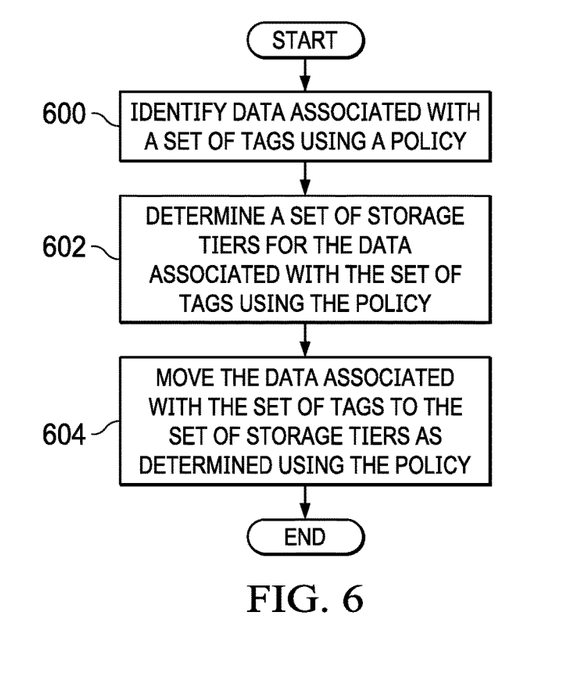
FIG. 6 is a flowchart of a process for managing a storage system in accordance with an illustrative embodiment.

Turning next to FIG. 6, a flowchart of a process for managing a storage system is depicted in accordance with an illustrative embodiment. The process in FIG. 6 can be implemented in hardware, software, or both. When implemented in software, the process can take the form of program code that is run by one of more processor units located in one or more hardware devices in one or more computer systems. For example, the process can be implemented in data manager 216 in computer system 206 in FIG. 2. In this flowchart, the steps are performed to identify and move data to appropriate storage tiers.

The process in the flowchart begins by identifying data associated with a set of tags using a policy (step 600). This step is used to identify the data that is needed to perform a process. The policy defines the set of tags for a set of types of data used in a process performed in an organization using data in the storage system.

A set of storage tiers for the data associated with the set of tags is determined using the policy (step 602). This step determines where the data should be located for use when performing the process. The policy defines a set of storage tiers for the data associated with the set of tags when the data associated with the set of tags is used by the process.

The data associated with the set of tags is moved to the set of storage tiers as determined using the policy (step 604). The process terminates thereafter.

Figure 7:
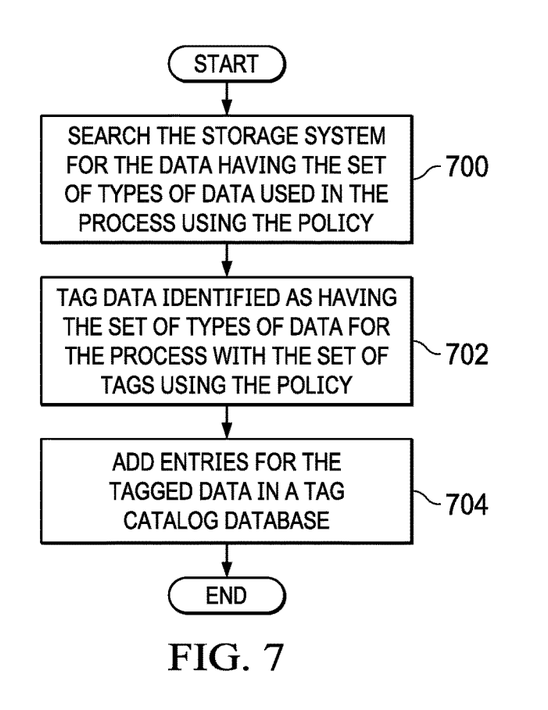
FIG. 7 is a flowchart of a process for managing a storage system in accordance with an illustrative embodiment.

Turning next to FIG. 7, a flowchart of a process for managing a storage system is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in data manager 216 in computer system 206 in FIG. 2. In this flowchart, the steps are performed assign tags to data for a process.

The storage system is searched for the data having the set of types of data used in the process using the policy (step 700). This step identifies data that will be used to perform a process in the organization.

The data identified as having the set of types of data for the process is tagged with the set of tags using the policy (step 702). The process then adds entries for the tagged data in a tag catalog database (step 704). The process terminates thereafter.

Figure 8:
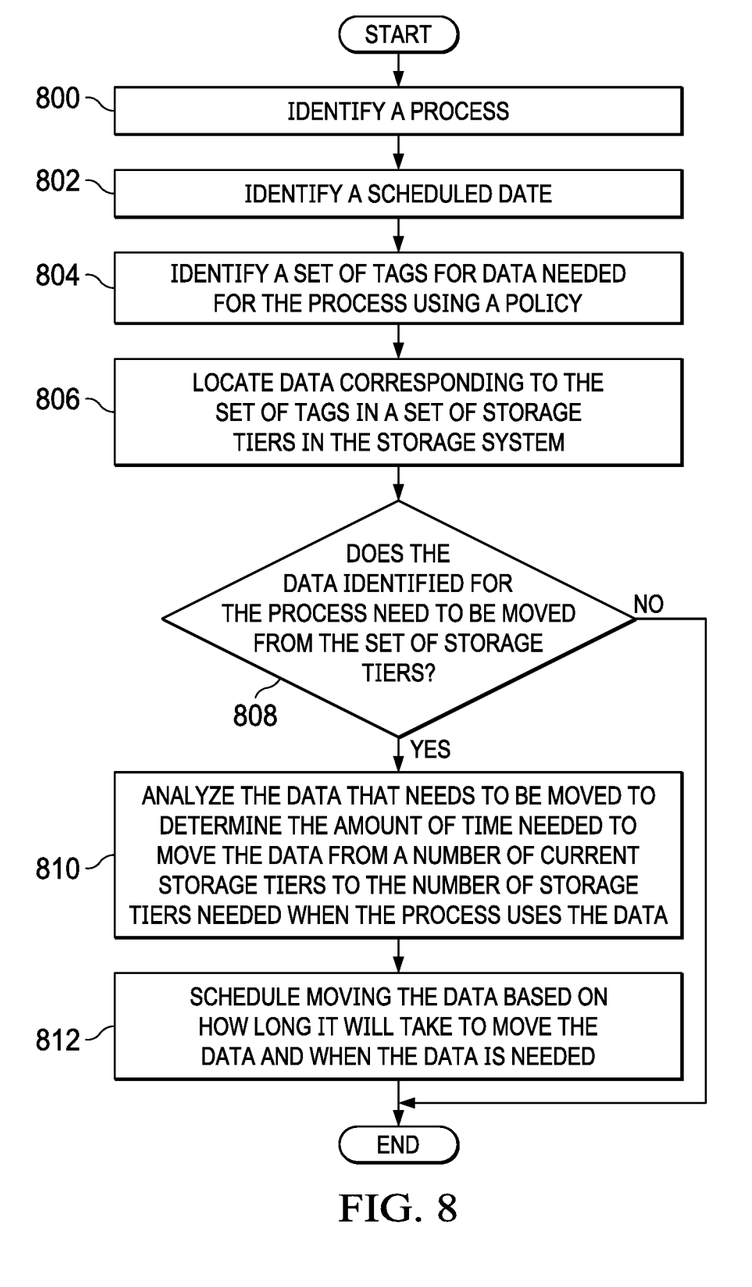
FIG. 8 is a flowchart of steps for prefetching data for a process in an organization in accordance with an illustrative embodiment.

With reference to FIG. 8, a flowchart of steps for prefetching data for a process in an organization is depicted in accordance with an illustrative embodiment. The steps in FIG. 8 can be implemented in hardware, software, or both. When implemented in software, the process can take the form of program code that is run by one or more processor units located in one or more hardware devices in one or more computer systems. For example, the process can be implemented in data manager 216 in computer system 206 in FIG. 2. In this flowchart, the steps are performed to prefetch data for use in performing a process in an organization.

As depicted, a process is identified (step 800). The process is for an organization. A scheduled date is identified for the process (step 802). A scheduled date can be identified from a scheduler in this illustrative example. The scheduler can be a process in a computer system that identifies dates for processes that are to be performed for the organization. The scheduler can identify at least one of a start date for performing the process, and availability date when data is expected to be available for use in performing the process, or other scheduling information that can be used to determine when data should be identified and moved if needed to the appropriate locations for use by the process.

A set of tags for data needed for the process is identified using a policy (step 804). In this illustrative example, the policy can identify tags for the types of data that will be used by the process. Data corresponding to the set of tags is located in a set of storage tiers in the storage system (step 806). As depicted, step 806 identifies the different types of storage in which the data can be found. The storage can be, for example, at least one of block storage, file storage, object storage, dark data storage, or other types of storage.

A determination is made as to whether the data identified for the process needs to be moved from the set of storage tiers (step 808). This determination can be made using a policy that identifies what storage tiers particular types of data should be stored in for use by the process. The policy can identify tags and desired storage tiers for particular types of data identified by the tags.

If the data needs to be moved, the data that needs to be moved is analyzed to determine the amount of time needed to move the data from a number of current storage tiers to the number of storage tiers needed when the process uses the data (step 810). The process schedules moving the data based on how long it will take to move the data and when the data is needed (step 812). The process terminates thereafter. With reference again to step 808, if the data is already located on the desired set of storage tiers, the process also terminates.

In this manner, the data can be made available when the data is needed to perform the process. Thus, one or more illustrative examples align the movement of data based on when a process is to be performed in an organization as compared to current processes that move data based on the use of the data. For example, dark data can be moved to the appropriate storage for further analysis and use by process in an organization.

For example, dark data is located in a binary large object (BLOB) object storage, and a tax-preparation process will use the data in block storage. In this case, a data manager may start pre-fetching the data 3 days before the process using this data starts to have sufficient time to translate the data and move the data. These determinations can be made using an artificial intelligence system. This type of system can move certain files, such as tax files from object storage, before the tax-preparation process begins. In this manner, the tax-preparation process is not delayed based on availability of data.

Thus, this type of prefetching can align the location data is located in storage tiers with a process performed in an organization using tagging that the data. In this manner, a data manager, such as data manager 134 in FIG. 1, data manager 216 in FIG. 2, data manager 300 in FIG. 3, or data manager 400 in FIG. 4 can be stored and migrated within in different storage tiers to meet the needs for the data in particular storage tiers perform process. This type of data management system can be interfaced with business process management (BPM) systems to provide increased availability and more efficient performance of processes for organizations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
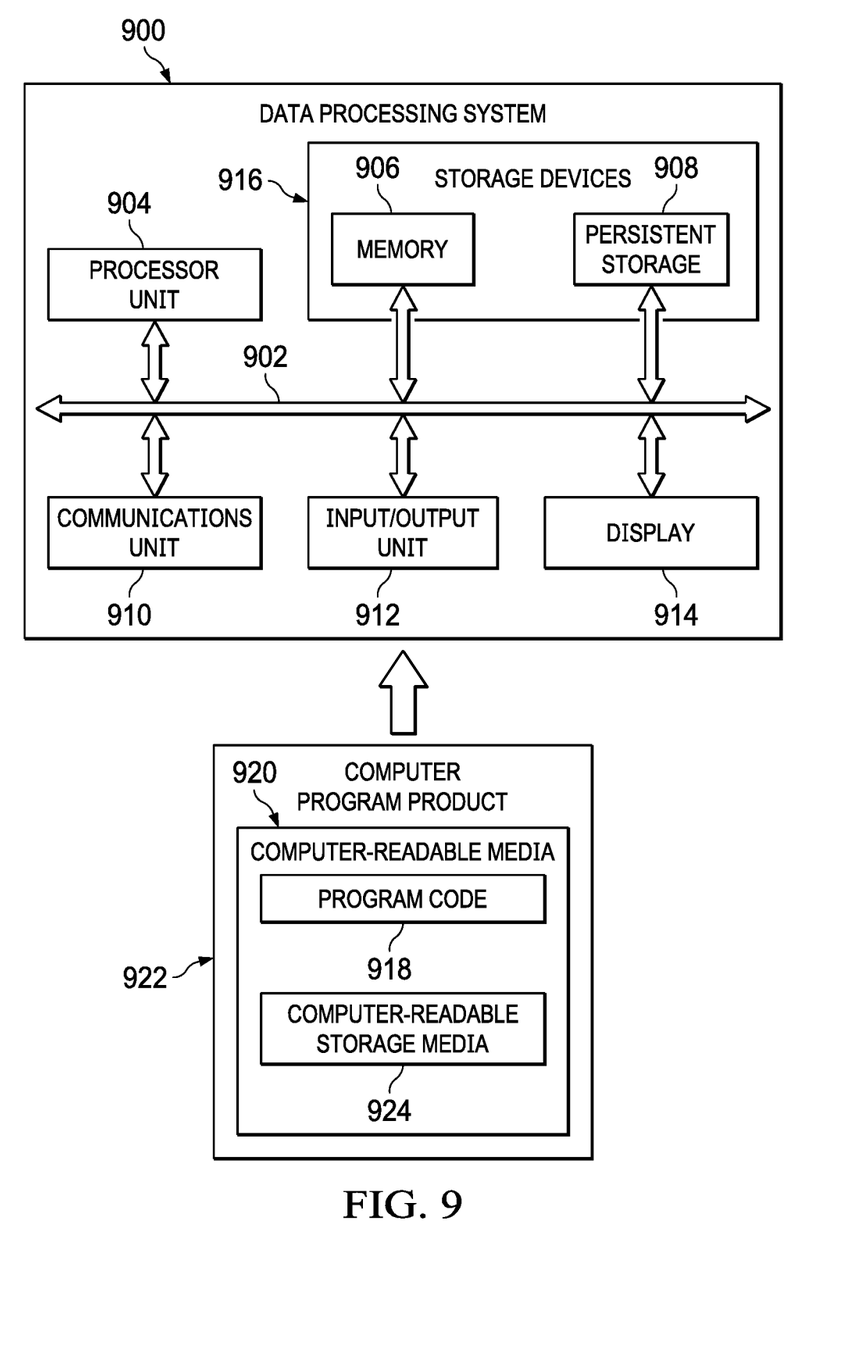
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 206 in FIG. 2. Further, data processing system 900 can be used in storage system 108 and storage system 210. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and processed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, illustrative embodiments of the present invention provide a computer implemented method, computer system, and computer program product for managing a storage system. Data associated with a set of tags is identified by a computer system using a policy, wherein the policy defines the set of tags for a set of types of data used in a process performed in an organization using data in the storage system. A set of storage tiers for the data associated with the set of tags is determined by the computer system using the policy. The policy defines a set of storage tiers for the data associated with the set of tags when the data associated with the set of tags is used by the process. The data associated with the set of tags is moved by the computer system to the set of set of storage tiers as determined using the policy.

In one or more illustrative examples, the movement of data between different type of storages can be managed based on organizational processes. One or more illustrative examples can enable moving of data based on one or more processes performed in an organization. Further, one or more technical solutions are present that enable prefetching data across different storage tiers using tags for types of data used in a process such that the data is available when needed for performing the process in the organization. Thus, one or more illustrative examples can be used to manage storage of data within a storage system in manner that aligns the location of the data within one or more storage tiers in the storage system to align the data to the manner in which the data is used by a process in an organization.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing movement of data between different types of storage, the method comprising:

identifying, by a computer system, a process to be performed in an organization;

identifying, by the computer system, data associated with a set of tags using a policy, wherein the policy is associated with the process and defines the set of tags for a set of types of data used in the process in order to identify the data needed to perform the process in the organization;

determining, by the computer system, a set of storage tiers for the data associated with the set of tags using the policy, wherein the policy defines the set of storage tiers for the data associated with the set of tags when the data associated with the set of tags is used by the process in order to determine where the data should be located for use when performing the process in the organization;

moving, by the computer system, the data associated with the set of tags to the set of storage tiers as determined using the policy in order to locate the data for use when performing the process in the organization; and performing, by the computer system, the process in the organization using the data in the set of storage tiers that was moved using the policy that defines both (i) the set of tags for the set of types of data used in the process performed in the organization and (ii) the set of storage tiers for the data associated with the set of tags when the data associated with the set of tags is used by the process performed in the organization.

2. The method of claim 1 further comprising:

analyzing, by the computer system, the data to determine an amount of time needed to move the data from a current storage tier to a needed storage tier that is needed when the process uses the data; and scheduling, by the computer system, a move of the data based on the amount of time needed to move the data, wherein moving, by the computer system, the data associated with the set of tags to the set of storage tiers as determined using the policy comprises:

moving, by the computer system, the data associated with the set of tags from a source file system to the set of storage tiers in a target file system as determined using the policy for the process such that the process can access the data in an expected storage tier for the process.

3. The method of claim 1 further comprising:

associating, by the computer system, the set of tags with the data in the storage tiers in the storage system using the policy for the process such that the policy defines what types of data in the data are used by the process.

4. The method of claim 3, wherein associating, by the computer system, the set of tags with the data in the storage tiers in the storage system using the policy for the process comprises:

searching, by the computer system, the storage system for the data having the set of types of data used in the process using the policy; and tagging, by the computer system, the data as having the set of types of data for the process with the set of tags using the policy.

5. The method of claim 4, wherein the data associated with the set of tags in the set of storage tiers forms tagged data for the process and further comprising:

adding, by the computer system, entries for the tagged data in a tag catalog database that comprises tags and locations of the tagged data in the storage system.

6. The method of claim 5, wherein adding, by the computer system, entries for the tagged data in a tag catalog database comprises:

adding, by an artificial intelligence system in the computer system, entries for the tagged data in a tag catalog database that comprises tags and locations of the tagged data in the storage system.

7. The method of claim 3 further comprising:

creating, by the computer system, a tagging process for associating the set of tags with the data in the set of storage tiers based on the policy defining the set of types of data in the data used in performing the process in the organization, wherein the associating is performed by executing, by the computer system, the tagging process.

8. A data management system that manages movement of data between different types of storage comprising:

a storage system storing data in a set of storage tiers in the storage system; and a computer system that identifies a process to be performed in an organization; identifies data associated with a set of tags using a policy, wherein the policy is associated with the process and defines the set of tags for a set of types of data used in the process in order to identify the data needed to perform the process in the organization; determines the set of storage tiers for the data associated with the set of tags using the policy, wherein the policy defines the set of storage tiers for the data associated with the set of tags when the data associated with the set of tags is used by the process in order to determine where the data should be located for use when performing the process in the organization; moves the data associated with the set of tags to the set of storage tiers as determined using the policy in order to locate the data for use when performing the process in the organization; and performs the process in the organization using the data in the set of storage tiers that was moved using the policy that defines both (i) the set of tags for the set of types of data used in the process performed in the organization and (ii) the set of storage tiers for the data associated with the set of tags when the data associated with the set of tags is used by the process performed in the organization.

9. The data management system of claim 8 wherein the computer system analyzes the data to determine an amount of time needed to move the data from a current storage tier to a needed storage tier that is needed when the process uses the data; and schedules a move of the data based on the amount of time needed to move the data, wherein in moving, by the computer system, the data associated with the set of tags to the set of storage tiers as determined using the policy, the computer system moves the data associated with the set of tags from a source file system to the set of storage tiers in a target file system as determined using the policy for the process such that the process can access the data in an expected storage tier for the process.

10. The data management system of claim 8, wherein the computer system associates the set of tags with the data in the set of storage tiers in the storage system using the policy for the process such that the policy defines what types of data in the data are used by the process.

11. The data management system of claim 8, wherein in associating the set of tags with the data in the set of storage tiers in the storage system using the policy for the process, the computer system searches the storage system for the data having the set of types of data used in the process using the policy and tags the data as having the set of types of data for the process with the set of tags using the policy.

12. The data management system of claim 10, wherein the data associated with the set of tags in the set of storage tiers forms tagged data for the process and an artificial intelligence system in the computer system adds entries for the tagged data in a tag catalog database that comprises tags and locations of the tagged data in the storage system.

13. The data management system of claim 10, wherein the computer system creates a tagging process for associating the set of tags with the data to form tagged data in the set of storage tiers based on the policy defining a set of types of data in the data used in performing the process in the organization, wherein the computer system associates the set of tags with the data executing the tagging process.

14. The data management system of claim 8, wherein the set of storage tiers comprises at least one of a block storage, a file storage, an object storage, or a dark data storage.

15. A computer program product for managing movement of data between different types of storage based on a process performed in an organization, the computer program product comprising:
   a computer-readable storage media;
   first program code for identifying a process to be performed in an organization;
   second program code, stored on the computer-readable storage media, for identifying data associated with a set of tags using a policy, wherein the policy is associated with the process and defines the set of tags for a set of types of data used in the process, in order to identify the data needed to perform the process in the organization;
   third program code, stored on the computer-readable storage media, for determining a set of storage tiers for the data associated with the set of tags using the policy, wherein the policy defines the set of storage tiers for the data associated with the set of tags when the data associated with the set of tags is used by the process in order to determine where the data should be located for use when performing the process in the organization;
   fourth program code, stored on the computer-readable storage media, for moving the data associated with the set of tags to the set of storage tiers as determined using the policy in order to locate the data for use when performing the process in the organization; and
   fifth program code, stored on the computer-readable storage media, for performing the process in the organization using the data in the set of storage tiers that was moved using the policy that defines both (i) the set of tags for the set of types of data used in the process performed in the organization and (ii) the set of storage tiers for the data associated with the set of tags when the data associated with the set of tags is used by the process performed in the organization.

16. The computer program product of claim 15 further comprising:
   program code, stored on the computer-readable storage media, for analyzing the data to determine an amount of time needed to move the data from a current storage tier to a needed storage tier that is needed when the process uses the data; and
   program code, stored on the computer-readable storage media, for scheduling a move of the data based on the amount of time needed to move the data, wherein the fourth program code comprises:
   program code, stored on the computer-readable storage media, for moving the data associated with the set of tags from a source file system to the set of storage tiers in a target file system as determined using the policy for the process such that the process can access the data in an expected storage tier for the process.

17. The computer program product of claim 15 further comprising:
   program code, stored on the computer-readable storage media, for associating the set of tags with the data to form tagged data in the set of storage tiers in the storage system using the policy for the process such that the policy defines what types of data in the data are used by the process.

18. The computer program product of claim 17, wherein the fourth program code comprises:
   program code, stored on the computer-readable storage media, for searching the storage system for the data having the set of types of data used in the process using the policy; and
   program code, stored on the computer-readable storage media, for tagging the data as having the set of types of data for the process with the set of tags using the policy.

19. The computer program product of claim 17 further comprising:
   program code, stored on the computer-readable storage media, for creating a tagging process for associating the set of tags with the data in the set of storage tiers based on the policy defining a set of types of data in the data used in performing the process in the organization, wherein the associating is performed by executing, by the computer system, the tagging process.

* * * * *